(12) United States Patent
Isogawa et al.

(10) Patent No.: US 7,129,295 B2
(45) Date of Patent: Oct. 31, 2006

(54) GOLF BALL

(75) Inventors: Kazuhiko Isogawa, Kobe (JP); Koichi Fujisawa, Kobe (JP)

(73) Assignee: SRI Sports Limited, Kobe (JP)

( * ) Notice: Subject to any disclaimer, the term of this patent is extended or adjusted under 35 U.S.C. 154(b) by 94 days.

(21) Appl. No.: 10/862,332

(22) Filed: Jun. 8, 2004

(65) Prior Publication Data
US 2005/0009640 A1    Jan. 13, 2005

(30) Foreign Application Priority Data
Jul. 9, 2003    (JP) ............................. 2003-194602

(51) Int. Cl.
*A63B 37/12*    (2006.01)
*C08G 18/62*    (2006.01)

(52) U.S. Cl. ........................ 525/131; 525/123; 528/75; 473/378

(58) Field of Classification Search .................... None
See application file for complete search history.

(56) References Cited

U.S. PATENT DOCUMENTS

| 4,884,814 | A | | 12/1989 | Sullivan | |
| 6,054,533 | A | * | 4/2000 | Farkas et al. | 525/90 |
| 6,369,125 | B1 | * | 4/2002 | Nesbitt | 522/142 |
| 6,435,986 | B1 | * | 8/2002 | Wu et al. | 473/378 |
| 6,486,261 | B1 | * | 11/2002 | Wu et al. | 525/332.6 |
| 6,565,918 | B1 | * | 5/2003 | Hughes et al. | 427/136 |
| 6,924,337 | B1 | * | 8/2005 | Kim et al. | 525/130 |
| 6,949,617 | B1 | * | 9/2005 | Rajagopalan et al. | 528/76 |
| 2003/0073514 | A1 | | 4/2003 | Iwami et al. | |
| 2005/0054782 | A1 | * | 3/2005 | Rajagopalan | 525/314 |

FOREIGN PATENT DOCUMENTS

| JP | 2709950 B2 | 10/1997 |
| JP | 2002-360740 A | 12/2002 |

OTHER PUBLICATIONS

Elastollan TPU product brochure from Elastogran.*

* cited by examiner

*Primary Examiner*—David J. Buttner
(74) *Attorney, Agent, or Firm*—Birch, Stewart, Kolasch & Birch, LLP

(57) ABSTRACT

A golf ball excellent in abrasion resistance and rebound characteristics. The golf ball according to the present invention is characterized in that the golf ball comprises a base resin constituting the cover containing a polyurethane having a polyisocyanate and a polyol as the constituents thereof and the polyol further comprises a hydroxyl group-containing diene polymer and/or a hydrogenated derivative of the hydroxyl group-containing diene polymer.

11 Claims, No Drawings

GOLF BALL

This Non-provisional application claims priority under 35 U.S.C. § 119(a) on Patent Application No(s). 2003-194602 filed in Japan on Jul. 9, 2003, the entire contents of which are hereby incorporated by reference.

BACKGROUND OF THE INVENTION

This invention relates to a golf ball having a cover, and in particular to a golf ball having a polyurethane cover.

Ionomer resins and polyurethanes have been used as the base resins constituting the covers of golf balls. Although golf balls having a cover made of an ionomer resin are superior in rebound characteristics, durability, processability, and the like and thus have been widely used, various problems associated with these balls have been pointed out that the golf balls are inferior in hitting feeling, insufficient in spin performance, inferior in controllability, and the like due to the high stiffness and hardness of these balls. To solve the problems, Japanese Patent No. 2709950, for example, discloses a method of improving the hitting feeling and spin performance by blending hard and soft ionomer resins, but blending of a soft ionomer resin is inevitably accompanied with decrease in rebound characteristics and abrasion resistance of the resulting golf ball. On the other hand, polyurethanes have been used as the base resin constituting the cover, because the resins provide golf balls more improved in hitting feeling and spin performance than ionomer resins. However, the rebound characteristics and abrasion resistance of the covers using polyurethanes are still at an unsatisfactory level. To solve these problems, Japanese Unexamined Patent Publication No. 2002-360740 discloses, for example, a golf ball using a mixture of a thermoplastic polyurethane elastomer and a thermoplastic polyamide elastomer as the base resin constituting the cover.

SUMMARY OF THE INVENTION

It is an object of the present invention to provide a golf ball which is free from the problems residing in the prior art.

It is another object of the present invention to provide a golf ball which can have a cover excellent in abrasion resistance and rebound characteristics.

According to an aspect of the present invention, a golf ball comprises a core, and a cover covering the core. The cover comprises a base resin including a polyurethane having a polyisocyanate and a polyol as the constituent. The polyol has a hydroxyl group-containing diene polymer and/or a hydrogenated derivative of the hydroxyl group-containing diene polymer.

DETAILED DESCRIPTION OF PREFERRED EMBODIMENTS OF THE INVENTION

A golf ball according to an embodiment of the present invention comprises a core and a cover covering the core. The cover includes a base resin which comprises a polyurethane having a polyisocyanate and a polyol as constituents. The polyol comprises a hydroxyl group-containing diene polymer and/or a hydrogenated derivative of the hydroxyl group-containing diene polymer (hereinafter, referred to simply as a "hydroxyl group-containing diene polymer and the like").

Use of a hydroxyl group-containing diene polymer and/or a hydrogenated derivative of the hydroxyl group-containing diene polymer as the polyol component constituting the polyurethane allow improvement in the rebound characteristics and abrasion resistance of the resulting covers.

The hydroxyl group-containing diene polymer is preferably, for example, at least one polymer selected from the group consisting of hydroxyl group-containing polybutadienes, hydroxyl group-containing polyisoprenes, and hydroxyl group-containing polybutadiene-polyisoprenes. In addition, the hydroxyl value of the hydroxyl group-containing diene polymer is preferably 30 to 130 mg KOH/g. In an preferred embodiment of the present invention, the polyurethane contained in the base resin constituting the cover of the golf ball according to the present invention contains as the constituent a compound having an active hydrogen, which reacts with the polyols as well as isocyanate groups of the polyisocyanate.

The hydroxyl group-containing diene polymer and/or the hydrogenated derivative of the hydroxyl group-containing diene polymer are used as the polyols constituting the polyurethane. The polyurethane contained in the base resin constituting the cover of the golf ball according to the present invention is not particularly limited, if the polyurethane is a product having multiple urethane bonds formed in its molecule by a reaction of a polyisocyanate and a polyol, and has a polyisocyanate and a polyol as the constituents. The polyurethanes further include, for example, products obtained by reacting, in addition to a polyisocyanate and a polyol, an additional compound having an active hydrogen that is reactive with isocyanate groups such as a polyamine if needed.

First, the hydroxyl group-containing diene polymer and/or the hydrogenated derivative of the hydroxyl group-containing diene polymer used as the polyols constituting the polyurethane will be described. The hydroxyl group-containing diene polymer is not particularly limited, if it is a diene polymer having at least two hydroxyl groups. Further, the location of hydroxyl groups in the diene polymer chain is not limited, and examples of the diene polymers include diene polymers having hydroxyl groups at both ends of the molecular main chains; diene polymers having hydroxyl groups at both the ends of the molecular side and main chains; diene polymers having hydroxyl groups at both ends of the molecular main chains and at the ends of the molecular side chains; and the like, but diene polymers having hydroxyl groups at both ends of the molecular main chain are preferable, as it is much easier to control the reaction of the diene polymers having hydroxyl groups at both ends of the molecular main chain with polyisocyanate.

The hydroxyl group-containing diene polymers are, for example, prepared by polymerizing a diene monomer using a polymerization initiator having a hydroxyl group. In addition, the hydroxyl group-containing diene polymers used in the present invention include hydroxyl group-containing diene copolymers prepared by copolymerizing two or more kinds of diene monomers or a diene monomer and another addition-polymerization monomer.

The polymerization initiators having a hydroxyl group are, for example, hydrogen peroxide, cyclohexanone peroxide, methylcyclohexanone peroxide, 2,2'-azobis[2-methyl-N-(2-hydroxyethyl)propionamide], and the like. Butadiene, isoprene, chloroprene, 1,3-pentadiene, cyclopentadiene, and the like may be used alone or as a mixture of two or more as the diene monomer. The other addition polymerization monomers, which may be copolymerized with the diene monomer, include, for example, styrene, α-methylstyrene, acrylonitrile, acrylic acid and the esters thereof, methacrylic acid and the esters thereof, vinyl chloride, vinyl acetate, butene, pentene, and the like. The amount of the other addition-polymerization monomer used is preferably less than 50 mole %, more preferably less than 40 mole %, and still more preferably less than 30 mole with respect to the total monomers.

The hydroxyl value of the hydroxyl group-containing diene polymer and the like used in the present invention is not particularly limited, but preferably 30 mg KOH/g or more, more preferably 35 mg KOH/g or more, and still more preferably 40 mg KOH/g or more. A hydroxyl value of less than 30 mg KOH/g may sometimes leads to insufficient reaction of the hydroxyl group-containing diene polymer with the polyisocyanate and consequently to decrease in flight distance of the resulting golf ball because of decrease in the strength and hardness of the resulting cover. In addition, the upper limit of the hydroxyl value of the hydroxyl group-containing diene polymer and the like is not particularly limited, but preferably 130 mg KOH/g, more preferably 120 mg KOH/g, and more preferably 110 mg KOH/g, as a hydroxyl value of more than 130 mg KOH/g tends to elongate the time required for reaction with the polyisocyanate, leading to excessive hardening of the resulting cover and consequently to deterioration of hitting feeling. The hydroxyl value of the hydroxyl group-containing diene polymer and the like may be determined according to JIS-K1557.

Additionally, the average molecular weight of the hydroxyl group-containing diene polymer and the like is not particularly limited, but preferably 500 or more and more preferably 1000 or more. The hydroxyl group-containing diene polymer and the like having an excessively lower average molecular weight contains a greater number of sites reactive with polyisocyanate, possibly elongating the time required for curing the composition and thus reducing the productivity of the process. Further, the upper limit of the average molecular weight above is not particularly limited, but preferably 30,000, and more preferably 10,000, as the hydroxyl group-containing diene polymer and the like having an excessively higher average molecular weight may reduce processability and workability (working efficiency) thereof.

The hydroxyl group-containing diene polymer is preferably at least one polymer selected from the group consisting of hydroxyl group-containing polybutadienes, hydroxyl group-containing polyisoprenes, and hydroxyl group-containing polybutadiene-polyisoprenes (copolymers), as the use of a hydroxyl group-containing diene polymer based on a polybutadiene, polyisoprene, or the like enables production of a polyurethane superior in rebound characteristics.

Alternatively, use of a liquid polymer as the hydroxyl group-containing diene polymer and the like is also preferable, as it allows easier adjustment of the composition of cover during production of the cover.

Typical examples of the hydroxyl group-containing diene polymers include R-45HT (terminal hydroxyl group-containing liquid polybutadiene, hydroxyl value: 46.6 mg KOH/g), and Poly ip (terminal hydroxyl group-containing liquid polyisoprene, hydroxyl value 46.6 mg KOH/g) manufactured by Idemitsu Atofina Corp.

The hydrogenated derivatives of the hydroxyl group-containing diene polymer are not particularly limited if they are hydrogenated products of the hydroxyl group-containing diene polymers described above, and may be prepared by any one of publicly known methods. For example, they may be obtained by hydrogenation of the hydroxyl group-containing diene polymer described above in the presence of a catalyst. The hydrogenation reaction may be conducted at a temperature in the range of room temperature to 200° C. under a hydrogen pressure of normal to 100 kg/cm$^2$G. The degree of hydrogenation of the hydroxyl-containing diene polymers is not particularly limited, but preferably 50% or more, and more preferably 70% or more. The degree of hydrogenation of the hydroxyl group-containing diene polymers may be determined by the bromine value obtained by bromimetric titration and calculated according to the following Formula.

Degree of hydrogenation (%)=100×[(Bromine value before hydrogenation−Bromine value after hydrogenation)/(Bromine value before hydrogenation)]

The hydroxyl group-containing diene polymer and the like described above is used as the polyol component constituting the polyurethane in the present invention, but any one of the commonly-used high-molecular weight polyols described below may also be used together. However, from the viewpoint of increasing the rebound characteristics of the resulting polyurethanes, the content of the hydroxyl group-containing diene polymer and the like is preferably 30 mass % or more, more preferably 40 mass % or more, and still more preferably 50 mass % or more with respect to the total polyol components.

Examples of the high-molecular weight polyols include polyether polyols such as polyoxyethylene glycol (PEG), polyoxypropylene glycol (PPG), polyoxytetramethylene glycol (PTMG), and the like; condensation polyester polyols such as polyethylene adipate (PEA), polybutylene adipate (PBA), polyhexamethylene adipate (PHMA), and the like; lactone-based polyester polyol such as poly-ε-caprolactone (PCL) and the like; polycarbonate polyols such as polyhexamethylene carbonate and the like; acrylic polyols; and the like, and these polyols may be used as a mixture of at least two or more kinds thereof. The average molecular weight of the high-molecular weight polyols is not particularly limited, but preferably, for example, 400 or more, and more preferably 1,000 or more. When the average molecular weight of the high-molecular weight polyol is too small, the resulting polyurethane becomes harder, leading to deterioration of the hitting feeling of the resulting golf balls. The upper limit of the average molecular weight of the high-molecular weight polyol is not particularly limited, but preferably, for example, about 10,000, and more preferably about 8,000.

Next, the polyisocyanate constituting the polyurethane contained in the base resin for cover will be described. The polyisocyanate is not particularly limited, if it has two or more isocyanate groups and is a compound or a mixture of two or more compounds selected from the group consisting of: aromatic polyisocyanates such as 2,4-toluene diisocyanate, 2,6-toluene diisocyanate, a mixture of 2,4- and 2,6-toluene diisocyanate (TDI), 4,4'-diphenylmethane diisocyanate (MDI), 1,5-naphthylene diisocyanate (NDI), 3,3'-bitolylene-4,4'-diisocyanate (TODI), xylylene diisocyanate (XDI), tetramethylxylylene diisocyanate (TMXDI), p-phenylene diisocyanate (PPDI), and the like; alicyclic or aliphatic polyisocyanates such as 4,4'-dicyclohexylmethane diisocyanate (H$_{12}$MDI), hydrogenated xylylene diisocyanate (H$_6$XDI), hexamethylene diisocyanate (HDI), and isophorone diisocyanate (IPDI); and the like. From the viewpoint of increasing the abrasion resistance of the resulting golf balls, the polyisocyanate constituting the polyurethane used is preferably an aromatic polyisocyanate. Use of an aromatic polyisocyanate increases the mechanical properties of the resulting polyurethane and provides covers excellent in abrasion resistance. In addition, from the viewpoint of increasing the abrasion of the resulting golf balls, preferably a non-yellowing polyisocyanate (TMXDI, XDI, HDI, H$_6$XDI, IPDI, H$_{12}$MDI, or the like), more preferably, 4,4'-dicyclohexylmethane diisocyanate (H$_{12}$MDI), is used as the polyisocyanate constituting the polyurethane. It is because 4,4'-dicyclohexylmethane diisocyanate (H$_{12}$MDI) has a rigid structure, allowing improvement in the mechanical properties of the resulting polyurethane and providing covers superior in abrasion resistance.

The polyurethane contained in the base resin constituting the cover of the golf ball according to the present invention may contain in addition to the polyisocyanate and the polyol described above, a compound having an active hydrogen reactive with the isocyanate groups (hereinafter, referred to simply as an "active hydrogen compound") as the third constituent if needed. Generally in polyurethanes, a high-molecular weight polyol component forms soft segments, while a polyisocyanate and a relatively low-molecular weight active hydrogen compound (chain-extender component) form hard segments, and phase separation of the soft and hard segments leads to the high elasticity of polyurethanes. In this embodiment, wherein a hydroxyl group-containing diene polymer and the like forms soft segments and a polyisocyanate forms hard segments together with a third constituent, a relatively low-molecular weight active hydrogen compound, the phase separation of the soft and hard segments is more clearly observed and the rebound characteristics of the resulting polyurethane improved.

The molecular weight of the relatively low-molecular weight active hydrogen compound is not particularly limited, if it is smaller than that of the polyol component constituting the soft segment, but preferably, for example, 500 or less, more preferably 400 or less, and still more preferably 200 or less.

The active hydrogen compound is, for example, a compound having at least two groups reactive with the isocyanate groups such as amino, hydroxyl, carboxyl, thiol groups and the like, and more preferably, a low-molecular weight polyol, a polyamine, an aminoalcohol, or the like.

Examples of the low-molecular weight polyols include diols such as ethylene glycol, diethyleneglycol, triethylene glycol, 1,3-butanediol, 1,4-butanediol, neo-pentylglycol, 1,6-hexanediol, 1,8-octanediol, and the like; and triols such as glycerin, trimethyrolpropane, hexanetriol, and the like, and 1,4-butanediol, 1,8-octanediol, or the like is preferably used, as it enhances the strength of the polyurethane obtained. Examples of the polyamines above include aliphatic polyamines such as ethylene diamine, propylene diamine, butylene diamine, hexamethylene diamine, and the like; alicyclic polyamines such as isophorone diamine, piperazine, and the like; aromatic polyamines; and the like. The aromatic polyamine is not particularly limited, if it has at least 2 amino groups bound to the aromatic ring directly or indirectly. The term "indirectly bound" means that an amino group is bound to an aromatic ring via, for example, a lower alkylene group.

Examples of the aromatic polyamines include monocyclic aromatic polyamines having two or more amino groups bound to an aromatic ring; and polycyclic aromatic polyamines containing two or more aminophenyl groups, wherein at least one amino group is bound to an aromatic ring. The monocyclic aromatic polyamines are, for example, a group of aromatic compounds having amino groups directly bound to the aromatic ring such as phenylene diamine, toluene diamine, diethyltoluene diamine, toluene diamine and the like; and a group of aromatic compounds having amino groups bound to the aromatic ring via a lower alkylene group such as xylylene diamine; and the like. Further, the polycyclic aromatic polyamines above may be polyaminobenzenes wherein at least two aminophenyl groups are directly bound, or wherein at least two aminophenyl groups are bound via lower alkylene groups or alkylene oxide groups. Among them, diaminodiphenylalkanes wherein two aminophenyl groups are bond via a lower alkylene group are preferable, and 4,4'-diaminodiphenylmethane and the derivatives thereof are particularly preferably.

The polyurethane contained in the base resin for the cover of the golf ball according to the present invention may be prepared by any one of publicly known methods. The preparative methods for polyurethanes include one-shot method, pre-polymer method, and the like. The one-shot method is a method of reacting a polyisocyanate, a polyol, and the like together to form a high-molecular weight polymer. On the other hand, the pre-polymer method is a method of reacting a polyisocyanate, a polyol, and the like in multiple steps to form a high-molecular weight polymer, for example, by preparing a low-molecular weight urethane pre-polymer and subsequently reacting the pre-polymer with a chain extender such as the active hydrogen compound described above to form a high-molecular weight polymer.

Any catalyst known in the art may be used for preparation of the polyurethanes. Examples of the catalysts above include monoamines such as triethylamine, N,N-dimethyl-cyclohexylamine, and the like; polyamines such as N,N,N',N'-tetramethylethylene diamine, N,N,N',N'',N''-pentamethyldiethylene triamine, and the like; cyclic diamines such as 1,8-diazabicyclo[5,4,0]-7-undecene (DBU), triethylene diamine, and the like; tin catalysts such as dibutyltin dilaurate, and dibutyltin diacetate; and the like.

The ratio of the polyisocyanate and polyol in the polyurethane contained in the base resin for the cover of the golf ball according to the present invention is not particularly limited, but an NCO/OH ratio (molar ratio), i.e., a ratio of the isocyanate groups in polyisocyanate to the hydroxyl groups in polyol, is preferably 0.9 or more, more preferably 1.0 or more, and more preferably 1.05 or more. When the NCO/OH ratio is less than 0.9, the resulting cover tends to have insufficient hardness. The NCO/OH ratio (molar ratio) is preferably 1.5 or less and more preferably 1.4 or less. When the NCO/OH ratio (molar ratio) is more than 1.5, the hardness of the resulting cover tends to be too higher, deteriorating the hitting feeling of the resulting golf balls.

Further, in the embodiment wherein the polyurethane contained in the base resin for the cover of the golf ball according to the present invention additionally contains the active hydrogen compound above, the molar ratio of NCO/(OH+active hydrogen) is preferably 0.9 or more, more preferably 1.0 or more, and still more preferably 1.05 or more in a similar manner to above. The molar ratio of NCO/(OH+active hydrogen) is preferably 1.5 or less and more preferably 1.4 or less.

The polyurethane contained in the base resin for the cover of the golf ball according to the present invention may be either a so-called thermoplastic or thermosetting polyurethane. The thermoplastic polyurethanes are polyurethanes that show plasticity by heating, and generally mean polyurethanes having straight chains polymerized to some degree. On the other hand, thermosetting polyurethanes (two-component thermosetting polyurethanes) are polyurethanes that are obtained by preparing a low-molecular weight urethane pre-polymer and polymerizing the pre-polymer with a chain extender (hardener) immediately before forming the cover. The thermosetting polyurethanes include polyurethanes having a straight chain structure and having a three-dimensionally crosslinked structure, which are prepared by controlling the number of the functional groups in the pre-polymer and in the chain extender (hardener) used.

In an embodiment wherein a thermoplastic polyurethane (pellet) previously highly polymerized is used as the thermoplastic polyurethane containing a polyisocyanate and a hydroxyl group-containing diene polymer and the like as a polyol, the base resin constituting the cover of the golf ball according to the present invention may contain, in addition to the thermoplastic polyurethane above, a thermoplastic elastomer such as a thermoplastic ionomer resin, a commonly-used thermoplastic polyurethane elastomer, a thermoplastic polyamide elastomer, a thermoplastic polyester elastomer, or the like; a diene block copolymer; or the like; or a mixture containing at least two or more resins thereof. From the viewpoint of increasing the rebound characteristics of the resulting cover, the content of the thermoplastic polyurethane above containing the hydroxyl group-containing diene polymer and the like described above as the polyol component is preferably 30 mass % or more, more preferably 40 mass % or more, and still more preferably 50 mass % or more, with respect to the total base-resin components The thermoplastic ionomer resins that may be used additionally for the base resin constituting the cover include thermoplastic ionomer resins conventionally used as the cover material for golf balls: namely, binary copolymers from a monomer and an $\alpha,\beta$-unsaturated carboxylic acid, at least part of the carboxyl groups therein being neutralized with a metal ion; ternary copolymers from a monomer, an $\alpha,\beta$-unsaturated carboxylic acid, and an $\alpha,\beta$-unsaturated carboxylic esters, at least part of the carboxyl groups therein being neutralized with a metal ion; and the like.

The metal ions used for neutralization include monovalent metal ions such as sodium, potassium, lithium ions, and the like; bivalent metal ions such as zinc, calcium, magnesium, copper, manganese ions and the like; trivalent metal ions such as aluminum, neodymium ions; and the like, and zinc ion is particularly preferable, as it provides a greater binding force of the agglomerates of metal ions and suppresses the decrease in mechanical strength due to dispersion of crosslinked diene rubber particles. Typical examples of the ionomer resins include Himilan 1605 (brand name of a sodium ion-neutralized ethylene-methacrylic acid copolymer-based ionomer resin), Himilan 1707 (brand name of a sodium ion-neutralized ethylene-methacrylic acid copolymer-based ionomer resin), Himilan 1706 (brand name of a zinc ion-neutralized ethylene-methacrylic acid copolymer-based ionomer resin), Himilan AM7315 (brand name of a zinc ion-neutralized ethylene-methacrylic acid copolymer-based ionomer resin), Himilan AM7317 (brand name of a zinc ion-neutralized ethylene-methacrylic acid copolymer-based ionomer resin), Himilan 1555 (brand name of a sodium ion-neutralized ethylene-methacrylic acid copolymer-based ionomer resin), and Himilan 1557 (brand name of a zinc ion-neutralized ethylene-methacrylic acid copolymer-based ionomer resin), manufactured by Du Pont-Mitsui polychemicals Co., Ltd.; IOTEK 8000 (brand name of a sodium ion-neutralized ethylene-methacrylic acid copolymer-based ionomer resin), and IOTEK 7010 (brand name of a zinc ion-neutralized ethylene-methacrylic acid copolymer-based ionomer resin), manufactured by Exxon Chemical Company; Surlyn 7930 (brand name of a lithium ion-neutralized ethylene-methacrylic acid copolymer-based ionomer resin), Surlyn 9945 (brand name of a zinc ion-neutralized ethylene-methacrylic acid copolymer-based ionomer resin), and Surlyn 8945 (brand name of a sodium ion-neutralized ethylene-methacrylic acid copolymer-based ionomer resin), manufactured by E.I. du Pont de Nemours and Company; and the like.

Typical examples of thermoplastic elastomers usable for the cover constituting base resin include thermoplastic polyamide elastomers sold from Toray Industries, Inc. by a brand name of "Pebax" (e.g., "Pebax 2533"); thermoplastic polyester elastomers sold from Du Pont-Toray Co., Ltd., by a brand name of "Hytrel" (e.g., "Hytrel 3548" and "Hytrel 4047"); thermoplastic polyurethane elastomers sold from BASF Japan Ltd., by a brand name of "Elastolan" (e.g., "Elastolan ET880"); and the like.

Further, the diene block copolymers usable for the base resin of the cover are block copolymers or partially hydrogenated block copolymers of conjugated diene compounds having double bonds derived therefrom. The basic block copolymers are block copolymers consisting of a polymer block A mainly from at least one vinyl aromatic compound and a polymer block B mainly from at least one conjugated diene compound. The partially hydrogenated block copolymers are those obtained by hydrogenating block copolymers. The vinyl aromatic compound constituting the block copolymers is, for example, a compound or a mixture of two or more compounds selected from styrene, $\alpha$-methylstyrene, vinyltoluene, p-t-butylstyrene, 1,1-diphenylstyrene, and the like, and preferably styrene. The conjugated diene compound is a compound or a mixture of two or more compounds selected from butadiene, isoprene, 1,3-pentadiene, 2,3-dimethyl-1,3-butadiene, and the like, and preferably butadiene, isoprene or the combination thereof. Preferred examples of the diene block copolymers include block copolymers having a styrene-butadiene-styrene (SBS) structure that have polybutadiene blocks containing epoxy groups; and block copolymers having a styrene-isoprene-styrene (SIS) structure containing epoxy groups, and the like.

Typical examples of the diene block copolymers include "Epofriend A1010" manufactured by Daicel Chemical Industries, Ltd.; "Septon HG-252" manufactured by Kuraray Co., Ltd.; and the like.

In a preferable embodiment of the present invention, the base resin constituting the cover of the golf ball according to the present invention contains a thermosetting polyurethane having the hydroxyl group-containing diene polymer and the like described above as the polyol component, as such a thermosetting polyurethane has numerous three-dimensional crosslinking sites and provides the covers of golf balls superior in durability. Examples of thermosetting polyurethanes include those prepared by curing an isocyanate group-terminal urethane pre-polymer having a hydroxyl group-containing diene polymer and the like as the polyol component with an active hydrogen compound (hardener) such as the polyamine, low-molecular weight polyol, or the like described above; those prepared by curing a hydroxyl or amino group-terminal urethane pre-polymer containing a hydroxyl group-containing diene polymer and the like as the polyol component with a hardener such as a polyisocyanate; or the like. The polyamine, low-molecular weight polyol, and polyisocyanate used as a hardener may be arbitrarily selected from the compounds described above.

The cover of the golf ball according to the present invention may further contain, in addition to the base resin described above, an oil, zinc, titanium oxide, a pigment component such as a blue pigment, a density adjuster such as calcium carbonate, barium sulfate or the like, a dispersant, an antioxidant, a UV absorbent, a photostabilizer, a fluorescent material, a fluorescent brightener, or the like, in the amount that does not deteriorate the properties of the cover.

The hardness of the cover of the golf ball according to the present invention is preferably 40 or more, more preferably 42 or more, and still more preferably 44 or more in Shore D hardness. When the cover is two soft, the spin amount of the resulting golf balls becomes too higher and the flight distance decreases. Additionally, the cover hardness is preferably 60 or less, more preferably 58 or less, and still more preferably, 56 or less in Shore D hardness. When the cover hardness is too high, the spin amount of the resulting golf balls tends to decreases and thus the controllability decreases.

The thickness of the cover of the golf ball according to the present invention is not particularly limited, but preferably 0.3 mm or more, more preferably 0.4 mm or more, and still more preferably 0.5 mm or more. It is because when the thickness of the cover is too thin, the abrasion resistance thereof tends to decrease. Further, the thickness of the cover is preferably 2.3 mm or less, more preferably 2.1 mm or less, and still more preferably 1.9 mm or less. When the thickness of the cover is too thick, the rebound characteristics of the golf balls obtained may decrease.

The structure of the golf ball according to the present invention is not particularly limited if the structure has a core and a cover covering the core, and thus the golf ball may be a two-piece golf ball having a core and a cover covering the core (single layer); a multi-piece golf ball having a multi-layer core consisting of a center and at least one intermediate layer covering the center, and a cover covering the multi-layered core; or a thread-wound golf ball having a thread-wound core and a cover covering the thread-wound core. Among them, two-piece and multi-piece golf balls are the preferred modes of the present invention, and accordingly hereinafter, the core of a two-piece golf ball and the multi-layered core of a multi-piece golf ball will be called solid cores and the preferred embodiments of the solid cores will be described.

The solid core of the golf ball according to the present invention preferably has a diameter of 39.0 mm or more, more preferably 39.5 mm or more, and still more preferably 40.8 mm or more. When the solid core diameter is less than 39.0 mm, the cover of the golf balls becomes too thick, leading to decrease in rebound characteristics. Further, the upper limit of the diameter of solid core is not particularly limited, but preferably 42.2 mm, more preferably 42.0 mm, and more preferably 41.8 mm. When the solid core diameter is more than 42.2 mm, the cover becomes relatively thinner, leading to an insufficient protective effect by the cover.

Furthermore, the compression deformation of the solid core, when a force is applied gradually from an initial load of 98 N to a final load of 1,275 N, is preferably 2.50 mm or more, more preferably 2.60 mm or more, and still more preferably 2.70 mm or more. An excessively lower deformation tends to result in an enhanced hardness of the solid core, leading to decrease in hitting feeling. On the other hand the upper limit of the compression deformation of the solid core when a force is applied gradually from an initial load of 98 N to a final load of 1,275 N is not particularly limited, but preferably 3.20 mm, more preferably 3.10 mm, and still more preferably 3.00 mm. An excessively larger deformation may sometimes lead to increase in softness of the ball and to heavier hitting feeling.

In another preferably embodiment, a solid core having a surface hardness greater than the center hardness is used for the golf ball according to the present invention. The difference in hardness between the surface hardness and the center hardness of the solid core of the golf ball according to the present invention is preferably 20 or more, and more preferably 25 or more, in Shore D hardness. By making the surface hardness of the solid core greater than the center hardness, it is possible to increase the launch angle, decrease the spin amount, and to improve the flight performance of the resulting ball. The upper limit of the difference in Shore D hardness between the surface and center hardness of the solid core is not particularly limited, but preferably 40, and more preferably 35, as an excessively larger difference in hardness may cause decrease in durability.

In addition, the center hardness of the solid core is preferably 30 or more, more preferably 32 or more, and still more preferably 35 or more, in Shore D hardness. When the center hardness of the solid core is less than 30 in Shore D hardness, the core may be too soft, leading to decrease in rebound characteristics. Further, the center hardness of the solid core is preferably 50 or less, more preferably 48 or less, and still more preferably 45 or less in Shore D hardness. When the center hardness is over 50 in Shore D hardness, the core becomes too hard, leading to deterioration in hitting feeling. In the present invention, the center hardness of solid core means a harness determined by cutting the solid core into two and measuring the center of the cross section by using a spring-type Shore D hardness testing machine.

The surface hardness of the solid core of the golf ball according to the present invention is preferably 45 or more, more preferably 50 or more, and still more preferably 55 or more in Shore D hardness. The solid core having a surface hardness of less than 45 is too soft, leading to decrease in rebound characteristics. The surface hardness of the solid core is preferably 65 or less, more preferably 62 or less, and still more preferably 60 or less in Shore D hardness. When the surface hardness is over 65 in Shore D hardness, the solid core may be too hard, leading to deterioration of the hitting feeling.

Hereinafter, the process of producing the golf balls according to the present invention will be explained taking a two-piece golf ball as the example, but it should be understood that the present invention is not limited to the process of production. Any one of cores hitherto known in the art may be used as the core for the two-piece golf balls, and the core is preferably a core prepared by heat pressing a core rubber composition containing a base rubber, a cocrosslinking agent, an organic peroxide, and a filler.

Any natural and/or synthetic rubbers may be used as the base rubber, and examples thereof include polybutadiene rubbers, natural rubbers, polyisoprene rubbers, styrene polybutadiene rubbers, ethylene-propylene-diene rubbers (EPDMs), and the like. Among them, high-cis content polybutadienes containing 40% or more, preferably 70% or more, and more preferably 90% or more cis bonds are particularly preferable, as they provide golf balls favorable in rebounding properties.

$\alpha,\beta$-unsaturated carboxylic acids having 3 to 8 carbons or the metal salts thereof may be used as the cocrosslinking agent above, and examples thereof include acrylic acid, methacrylic acid, and the metal salts thereof. Metals for the metal salts include zinc, magnesium, calcium, aluminum, and sodium, and use of zinc is preferable as it allows increase in the rebound characteristics of the resulting golf balls. The amount of the cocrosslinking agent used is preferably 10 parts by weight or more, more preferably 20 parts by weight or more, and 50 parts by weight or less, more preferably 40 parts by weight or less with respect to 100 parts by weight of the base rubber. When the amount of the cocrosslinking agent used is less than 10 parts by weight, the amount of organic peroxide should be increased for securing the hardness of the resulting golf balls and thus the rebound characteristics thereof may decline. In contrast, when the amount of the cocrosslinking agent used is more than 50 parts by weight, the core may become tow hard, deteriorating the hitting feeling.

Organic peroxides contained in the core rubber composition include, for example, organic peroxides such as dicumyl peroxide, 1,1-bis(t-butylperoxy)-3,5-trimethylcyclohexane, 2,5-dimethyl-2,5-di(t-butylperoxy)hexane, di-t-butylperoxide, and the like, and dicumyl peroxide is favorably used among them. The amount of the organic peroxide blended is preferably 0.2 to 3 parts by weight, and more preferably 0.3 to 2 parts by weight, with respect to 100 parts by weight of the base rubber. When the organic peroxide content is less than 0.2 parts by weight, the resulting core tends to be too soft, leading to decrease in rebound characteristics, while when it is more than 3 parts by weight, the amount of the cocrosslinking agent used should be increased for securing the suitable hardness of the golf balls, leading to decrease in the rebound characteristics thereof.

The fillers contained in the core rubber compositions include inorganic fillers such as zinc oxide, barium sulfate, calcium carbonate, magnesium oxide, tungsten powder, molybdenum powder, and the like. The amount of the filler blended is preferably 2 parts by weight or more, more preferably 3 parts by weight or more, and 50 parts by weight or less, more preferably 35 parts by weight or less, with respect to 100 parts by weight of the base rubber. When the amount of the filler blended is less than 2 parts by weight, it becomes difficult to adjust the weight of the resulting core rubber compositions, while when it is more than 50 parts by weight, the content of the rubber components by weight tends to be too small, leading to decrease in rebound characteristics.

The core rubber compositions may contain, in addition to the base rubber, cocrosslinking agent, organic peroxide, and filler described above, an organic sulfur compound, an antioxidant, a peptiser, or the like arbitrarily. The amount of the antioxidant blended is preferably 0.1 parts by weight or more and 1 parts by weight or less with respect to 100 parts by weight of the base rubber. The amount of the peptiser blended is preferably 0.1 parts by weight or more and 5 parts by weight or less with respect to 100 parts by weight of the base rubber.

The heat-press molding conditions of the core rubber compositions may be properly established according to the rubber compositions, but the core rubber compositions are usually heated in two steps at 130 to 200° C. for 10 to 60 minutes or at 130 to 150° C. for 20 to 40 minutes and then at 160 to 180° C. for 5 to 15 minutes.

In the present invention, the cores formed as described above are coated with a cover composition containing the base resin and the additives described above, to produce final golf balls. For example, when a thermosetting polyurethane is used as the base resin constituting the cover, the cover may be formed by injecting a cover composition into the hemispherical mold wherein a core to be covered is placed, and then inverting the mold, connecting the mold to another hemispherical mold into which the cover composition is also injected, and carrying out a curing reaction. The curing reaction of the cover composition containing the above thermosetting polyurethane is carried out at 30° C. to 120° C., preferably 50° C. to 80° C. for 2 to 60 minutes, preferably 5 to 30 minutes.

If a thermoplastic polyurethane (pellet) previously highly polymerized is used as the base resin constituting the cover, the curing reaction is carried out, for example, by forming a cover composition into a hemispherical half shell form, subsequently covering a core using two pieces of the resulting hemispherical half shells, and pressing the resulting composite at 130 to 170° C. for 1 to 5 minutes; by injecting the cover composition around a core so that it covers the entire surface of the core; or the like.

During production of final golf balls by covering the core with covers, many dents, called "dimples", are formed usually on the surface of the golf balls. The surface of final golf balls may be additionally polished, for example, by sand blasting. The golf balls according to the present invention are preferably subjected to paint finishing, marking with a stamp, and the like for improving the appearance and commercial value thereof.

Heretofore, the present invention is described taking a two-piece golf ball as an example, but in the case of a thread-wound golf ball, for example, a thread-wound core may be used instead, and in the case of a multi-piece (three-piece or more) golf ball, at least one or more layers may be formed between the core and the cover.

The thread-wound core above consists of a center and a thread rubber layer formed by winding thread rubbers around the center in a stretched state, and any one of the thread-wound cores hitherto known in the art may be used. Either a liquid-based center (liquid center) or a rubber-based center (solid center) may be used as the center. In addition, any one of thread rubbers similar to those used for the thread layer of thread-wound golf balls conventionally may be used as the thread rubber to be wound around the above center, and an example thereof is a thread rubber obtained by vulcanizing a rubber composition consisting of a natural rubber or a blend of a natural rubber and a synthetic polyisoprene, sulfur, a vulcanization aid, a vulcanization accelerator, an antioxidant, and the like. The thread-wound cores are prepared by winding the thread rubbers around the center while stretching them about 10 times.

In addition, the same resin as the base resin constituting the cover may be used as the intermediate layers of multi-piece (three-piece or more) golf balls, and examples of the resins include thermoplastic elastomers such as thermoplastic ionomer resins described above, thermoplastic polyamide elastomers, thermoplastic polyester elastomers, thermoplastic polyurethane elastomers, and the like described above; diene block copolymers; and the like. The intermediate layers may additionally contain a density adjuster such as barium sulfate or tungsten, an antioxidant, a pigment, or the like.

The method of forming the intermediate layers is not particularly limited, but examples thereof are methods of previously forming a material for the intermediate layer into a hemispherical half shell form and press molding the solid center covered with two pieces of the shells; covering the solid center with the material by injection-molding the material for intermediate layer directly onto the surface of the solid center; and the like.

The compression deformation of the golf ball according to the present invention, when the ball is compressed under a gradually increasing load from an initial load of 98 N to a final load of 1,275 N, is preferably 2.1 mm or more, more preferably 2.3 mm or more, and still more preferably 2.5 mm or more. When the deformation is too small, the hitting feeling deteriorates due to hardening of the ball. On the other hand, the upper limit of the compression deformation as determined under a gradually increasing load from an initial load of 98 N to a final load of 1,275 N is not particularly limited, but preferably 4.0 mm, more preferably 3.8 mm, and still more preferably 3.5 mm. Too larger the deformation is, too softer the resulting ball is, sometimes leading to heavier hitting feeling.

EXAMPLE

Hereinafter, the present invention will be described in detail with reference to EXAMPLES, but it should be understood that the present invention is not limited to the following EXAMPLES, and any modifications and working modes within the scope of the present invention are also included in the scope of the invention.

[Evaluation Methods]

(1) Repulsion Index

An aluminum circular cylinder 200 g in weight was crashed to each golf ball at a velocity of 45 m/sec. The repulsion index of each golf ball was determined by determining the velocities of the circular cylinder and golf ball before and after collision respectively and calculated from the velocities and the weights. Measurements are repeated five times for each golf ball, and the average thereof is obtained. The repulsion index is a relative value with respect to 100 of the average of golf ball No. 4, and the larger the repulsion index is, the larger the rebound characteristics are.

(2) Abrasion Resistance

Each golf ball was hit at two points thereof with a commercially available pitching wedge (PW) connected to a swing robot manufactured by TRUETEMPER Co. at a head speed of 36 m/sec, and the abrasion resistance was evaluated by examining the hit portions by visual observation according to the following criteria.
  ◯: The surface of the golf ball slightly has a cut, but it is not particularly noticeable.
  Δ: The surface of the golf ball clearly has a cut, and the surface becomes fluffy.
  X: The surface of the golf ball is considerably chipped off, and the surface noticeably becomes fluffy.

(3) Flight Performance

Each golf ball was hit with a metal head driver attached to a swing robot manufactured by TRUETEMPER Co. at the head speed of 50 m/sec, and the flight distance (carry) from the hitting point to a point at which the ball dropped to the ground was measured. Five golf balls of each ball type were measured as to their respective carries to find an average value. The average values are expressed by indexes with respect to 100 of the average flight distance of golf ball No. 4.

(4) Compression Deformation (mm)

The deformation of golf balls or the cores (shrinkage of golf balls in the compression direction) was determined under a gradually increasing load from an initial load of 98 N to a final load of 1,275 N.

(5) Cover Hardness (Slab Hardness)

A sheet having a thickness about 2 mm was prepared by heat-pressing a cover composition and stored at 23° C. for 2 weeks. The cover hardness of the sheet was determined, as three or more of the sheets are piled so that there would be no adverse effect of the measuring board, by using a spring-type Shore D hardness testing machine as specified in ASTM-D2240.

[Preparation of Two-Piece Golf Balls]

(1) Preparation of Core

A rubber composition for a core having a composition set forth in TABLE 1 is blended, and is heat-pressed in a pair of upper and lower molds having respectively hemispherical cavities at 170° C. for 15 minutes, to give a spherical core having a diameter of 41.2 mm. The compression deformation of the core obtained was 2.95 mm.

TABLE 1

| Core rubber composition | Composition (parts by weight) |
|---|---|
| Polybutadiene rubber | 100 |
| Zinc acrylate | 33 |
| Zinc oxide | 12 |
| Diphenyl sulfide | 0.5 |
| Dicumyl peroxide | 1 |

Polybutadiene rubber: BR18 manufactured by JSR (cis content: 96% or more)
Zinc acrylate: ZNDA-90S manufactured by Japan Distillation
Zinc oxide: Ginrei R manufactured by Toho Zinc
Dicumyl peroxide: Percumyl D manufactured by NOF Corporation
Diphenyl sulfide: manufactured by Sumitomo Seika Chemicals (2) Preparation of Cover Compositions The cover compositions of golf balls No. 1 to 3 are prepared by blending the ingredients set forth in TABLE 2 at 23° C. With respect to golf balls No. 4 and 5, the ingredients set forth in TABLE 2 were blended in a biaxial kneading extruder, to give pellet-shaped cover compositions. The ingredients above were extruded under the conditions of a screw diameter of 45 mm, a screw rotation number of 200 rpm, and a screw L/D of 35, and heated at 200 to 260° C. at the die position of the extruder.

TABLE 2

|  |  | Golf ball No. | | | | |
|---|---|---|---|---|---|---|
|  |  | 1 | 2 | 3 | 4 | 5 |
| Cover composition | Hydroxyl group-containing polybutadiene | 100 | 50 | — | — | — |
|  | Hydroxyl group-containing polyisoprene | — | 50 | 100 | — | — |
|  | Polyisocyanate | 24.8 | 25.2 | 25.6 | — | — |
|  | 1,4-Butanediol | 3.6 | 3.7 | 3.8 | — | — |
|  | Dibutyltin dilaurate | 0.05 | 0.05 | 0.05 | — | — |
|  | Elastolan XNY97A | — | — | — | 80 | — |
|  | Pebax 5533SN00 | — | — | — | 20 | — |
|  | Himilan 1605 | — | — | — | — | 50 |
|  | Surlyn 9320 | — | — | — | — | 50 |
|  | Titanium oxide | 4 | 4 | 4 | 4 | 4 |
| Evaluation | Cover hardness (Shore D) | 48 | 46 | 44 | 48 | 50 |
|  | NCO/OH (molar ratio) | 1.05 | 1.05 | 1.05 | — | — |

Composition: parts by weight

Hydroxyl group-containing (liquid) polybutadiene: R-45HT (hydroxyl value: 46.6 mg KOH/g), manufactured by Idemitsu Petrochemical Co., Ltd.
Hydroxyl group-containing (liquid) polyisoprene: Poly ip (hydroxyl value: 46.6 mg KOH/g), manufactured by Idemitsu Petrochemical Co., Ltd.
Polyisocyanate: Millionate MTL (carbodiimide-modified MDI, NCO content: 28.8%), manufactured by Nippon Polyurethane Industry Co., Ltd.

Elastolan XNY97A: Thermoplastic polyurethane elastomer from 4,4'-dicyclohexylmethane diisocyanate and polyoxytetramethylene glycol (PTMG), manufactured by BASF Japan Ltd.

Pebax 5533SN00: Thermoplastic polyether polyamide elastomer manufactured by Elf Atochem Japan Co., Ltd.

Himilan 1605: Sodium ion-neutralized ethylene-methacrylic acid copolymer-based ionomer resin manufactured by Du Pont-Mitsui polychemicals Co., Ltd.

Surlyn 9320: Zinc ion-neutralized ethylene-methacrylic acid n-butyl acrylate ternary copolymer-based ionomer resin manufactured by E.I. du Pont de Nemours and Company (3) Preparation of Covers The covers of golf balls No. 1 to 3 were formed by injecting a cover composition into a hemispherical mold which contains the core obtained above is placed, and then inverting and connecting the mold to another hemispherical mold into which the cover composition is also injected, and press-molding the composite. The curing conditions were a temperature of 100° C. and a period of 10 minutes. The covers of golf balls No. 4 and 5 were formed by injection-molding each cover composition obtained above into a hemispherical half shell form; covering the core obtained as described above by using two pieces of the hemispherical half shells; and heat-pressing the composite in a mold at 170° C. for 2 minutes. The final golf balls thus obtained were removed from the mold, and after the flashes thereon were taken away, coated on the surfaces thereof with a clear paint, to give golf balls No. 1 to 5 having a diameter of 42.8 mm and a weight of 45.4 g. Results of evaluating the compression deformation, repulsion index, flight performance, and abrasion resistance of the golf balls are summarized in TABLE 3.

TABLE 3

| | Golf ball No. | | | | |
| --- | --- | --- | --- | --- | --- |
| | 1 | 2 | 3 | 4 | 5 |
| Compression deformation (mm) | 2.85 | 2.92 | 2.97 | 2.8 | 2.8 |
| Repulsion index | 108 | 106 | 104 | 100 | 94 |
| Flight distance | 106 | 105 | 104 | 100 | 93 |
| Abrasion resistance | ○ | ○ | ○ | X | X |

The golf balls No. 1 to 3 contain a polyurethane as the base resin constituting the cover, and the polyurethane contains a polyisocyanate component and a hydroxyl group-containing diene polymer as the polyol component. As apparent from Table 3, these golf balls are excellent in all of the flight performance, rebound characteristics, and abrasion resistance.

In contrast, golf ball No. 4, which contains as the base resin constituting the cover a thermoplastic polyurethane and a thermoplastic polyether polyamide elastomer different from the hydroxyl group-containing diene polymer, is not high enough in abrasion resistance. In addition, golf ball No. 5, wherein an ionomer resin is used as the base resin constituting the cover, exhibited decrease not only in abrasion resistance but also in rebound characteristics and flight performance.

As described above, an inventive golf ball has a polyurethane cover excellent in abrasion resistance, rebound characteristics, and flight performance.

This application is based on Japanese patent application No. 2003-194602, filed in Japan Patent Office on Jul. 9, 2003, the contents of which are hereby incorporated by reference.

Although the present invention has been fully described by way of example with reference to the accompanied drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. A golf ball comprising:
   a core, and
   a cover covering the core, the cover comprising a base resin including a polyurethane having a polyisocyanate and a polyol as the constituent, wherein the polyol comprises a hydroxyl group-containing diene polymer, and wherein the hydroxyl group containing diene polymer comprises hydroxyl group-containing polybutadienes, hydroxyl group-containing polyisoprenes and hydroxyl group-containing polybutadiene-polyisoprenes.

2. The golf ball according to claim 1, wherein the hydroxyl value of the hydroxyl group-containing diene polymer is 30 to 130 mg KOH/g.

3. The golf ball according to claim 1, wherein the polyurethane further comprises a compound having an active hydrogen reactive with an isocyanate group.

4. The golf ball according to claim 1, wherein the polyol further comprises a hydrogenated derivative of the hydroxyl group-containing diene polymer, the hydrogenated derivative being at least one derivative selected from the group consisting of: hydrogenated polybutadiene polyol, hydrogenated polyisoprene polyol and hydrogenated polybutadiene-polyisoprene polyol.

5. A golf ball comprising:
   a core, and
   a cover covering the core, the cover comprising a base resin including a polyurethane having a polyisocyanate and a polyol as the constituent, wherein the polyol comprises a hydroxyl group-containing diene polymer, and wherein the hydroxyl group-containing diene polymer comprises hydroxyl group-containing polybutadienes and hydroxyl group-containing polyisoprenes, and wherein the hydroxyl value of the hydroxyl group-containing diene polymer is 30 to 130 mg KOH/g.

6. The golf ball according to claim 5, wherein the polyurethane further comprises a compound having an active hydrogen reactive with an isocyanate group.

7. The golf ball according to claim 5, wherein the polyol further comprises a hydrogenated derivative of the hydroxyl group-containing diene polymer, the hydrogenated derivative being at least one derivative selected from the group consisting of hydrogenated polybutadiene polyol, hydrogenated polyisoprene polyol and hydrogenated polybutadiene polyisoprene polyol.

8. A golf ball comprising:
   a core, and
   a cover covering the core, the cover comprising a base resin including a polyurethane having a polyisocyanate and a polyol as the constituent, wherein the polyol comprises a hydrogenated derivative of a hydroxyl group-containing diene polymer, wherein the hydrogenated derivative comprises hydrogenated polyisoprene polyol, and wherein the hydroxyl value of the hydroxyl group-containing diene polymer is 30 to 130 mg KOH/g.

9. The golf ball according to claim 8, wherein the polyol further comprises a hydroxyl group-containing diene polymer, the hydroxyl group-containing diene polymer being at least one polymer selected from the group consisting of hydroxyl group-containing polybutadienes, hydroxyl group-containing polyisoprenes and hydroxyl group-containing polybutadiene polyisoprenes.

10. The golf ball according to claim 8, wherein the hydrogenated derivative of the hydroxyl group-containing diene polymer further comprises at least one hydrogenated derivative selected from the group consisting of hydrogenated polybutadiene polyol and hydrogenated polybutadiene polyisoprene polyol.

11. The golf ball according to claim 8, wherein the polyurethane further comprises a compound having an active hydrogen reactive with an isocyanate group.

* * * * *